Feb. 13, 1968   S. W. DEANE   3,368,639
APPARATUS FOR THE REMOTE ELECTRONIC CONTROL OF VEHICLE SPEEDS
Filed March 12, 1965   5 Sheets-Sheet 5
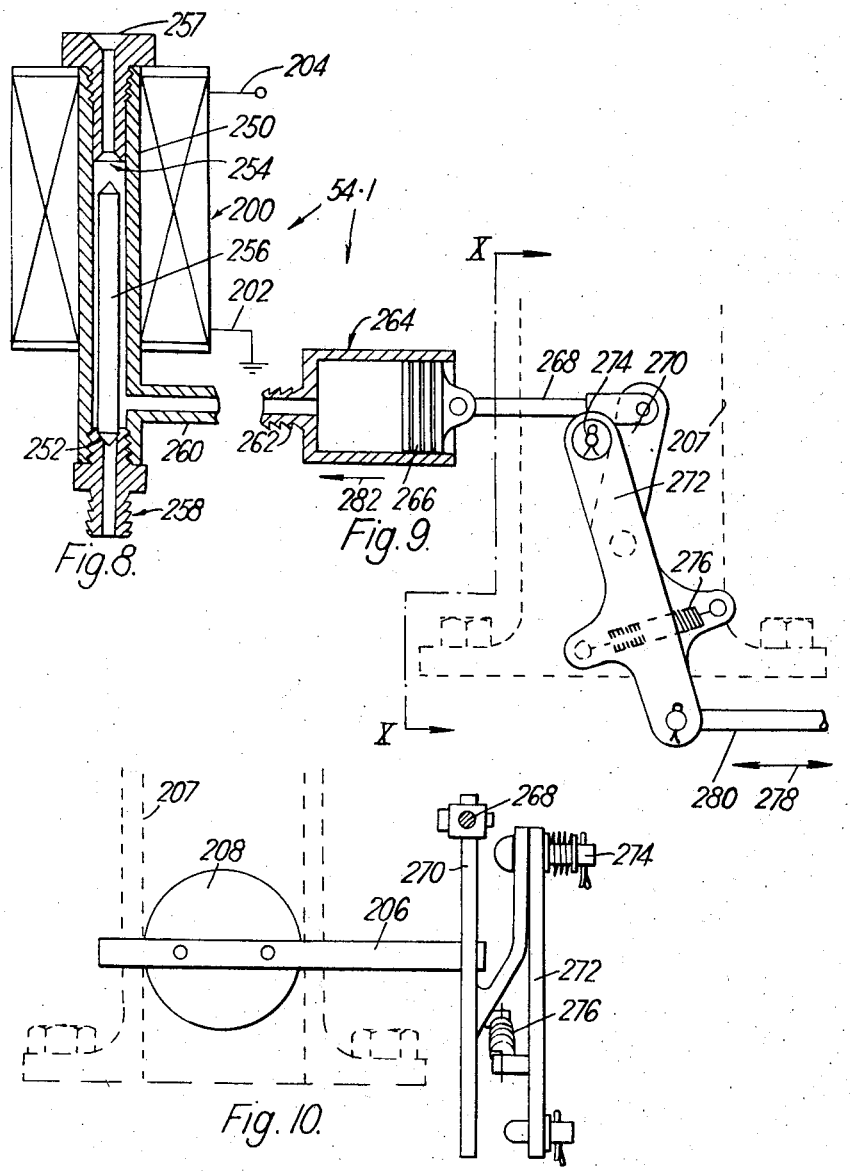
Inventor
Stanley Williams Deane
By Karl W. Flocks
Attorney

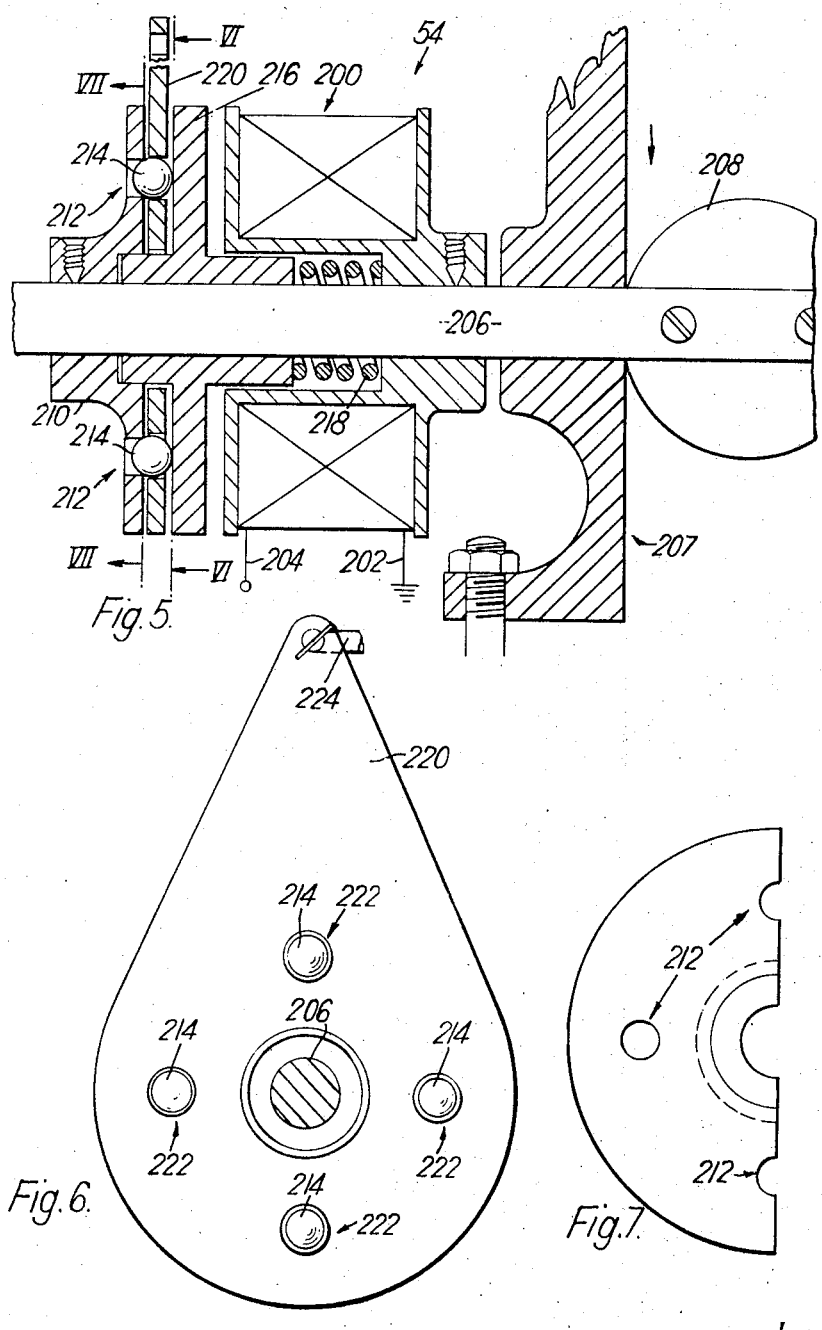

United States Patent Office 3,368,639
Patented Feb. 13, 1968

3,368,639
APPARATUS FOR THE REMOTE ELECTRONIC
CONTROL OF VEHICLE SPEEDS
Stanley Williams Deane, 601 6th Floor, Thibault House,
Foreshore, Cape Town, Cape Province, Republic of
South Africa
Filed Mar. 12, 1965, Ser. No. 439,398
Claims priority, application Republic of South Africa,
Mar. 17, 1964, 1,288/64
7 Claims. (Cl. 180—98)

This invention relates to apparatus for controlling vehicle speeds electronically.

According to the invention, electronic speed control apparatus for vehicles includes signal-emitting means adapted to emit signals for the control of speed of the vehicle, and comprises a frequency signal transmitter for location at a control station, and adjustable to emit signals at different frequencies, each frequency corresponding to a different speed for which the vehicles are to be regulated; signal-receiving means adapted for mounting on a vehicle, and adapted to receive signals emitted by the signal-emitting means; and response means having means for connection to the signal-receiving means, and adapted for mounting on a vehicle and adapted to respond to a signal received by the signal-receiving means and adapted to limit the speed of the vehicle in response to such a signal, to a value corresponding to the frequency of the emitted signal.

The signal-receiving means may be adapted to provide current in proportion to the signal frequency. The speed control apparatus may include further, a device having means for receiving drive from the vehicle and adapted to generate fluctuating electric current, the fequency of fluctuation being proportional to the speed of the vehicle; a circuit for providing current in proportion to the frequency of the fluctuations of the fluctuating current; a mating circuit for superimposing upon each other in opposite directions the two currents proportional to the signal and generated frequencies; an amplifying circuit to amplify the effective current when the current corresponding to the generated frequency exceeds in magnitude the current corresponding to the signal frequency; and a response means circuit forming part of the response means and connected to the amplifying circuit for using the amplified effective current to render the response means operative. A relay may be provided, having contacts in series with the response means circuit, the relay having a coil energizable to close the contacts when the signal receiving means provides current flow proportional to the signal frequency, thereby preventing energizing of the response means when no signal is being received by the signal receiving means.

The speed control apparatus may also include indicating means adapted for mounting in a vehicle and adapted to measure the magnitude of the current proportional to the signal frequency, the indicating means being calibrated in speed units to indicate the control speed. If desired, there may be provided additional indicating means for providing an audible or visible signal and adapted for mounting inside a vehicle and having a circuit connected to the response means circuit and adapted to operate when effective current flows in the response means circuit to indicate that the speed control limit is being exceeded. The speed control apparatus may further include external indicating means adapted for mounting externally on a vehicle, and having a circuit adapted for connection to the signal-receiving means, and adapted to indicate when the vehicle is in a zone subject to speed control, the external indicating means being energizable by the said circuit when a signal is being received by the signal-receiving means. There may further be provided warning signal means adapted for mounting externally on a vehicle, and having a warning signal means circuit for connection to the response means circuit and adapted to operate when effective current flows in the response means circuit for indicating to other traffic that the vehicle is under speed control and is being decelerated to the control speed. A flasher unit may be incorporated in the warning signal means circuit for causing the warning signal means to operate intermittently when the control speed is being exceeded and while the vehicle is being decelerated. A flasher unit may be a thermo-sensitive switch adapted to open and close in quick succession when current flows. It may be of the type used for the direction indicative lights of motor vehicles.

The device adapted to generate fluctuating electric current, may be a tacho-generator, and the means for receiving drive from the vehicle, may be a drive connection adapted to receive drive from the vehicle in a manner similar to a speedometer take-off drive. Alternatively, the device may be a commutator-type pulse generator, having similar means to the tacho-generator for receiving drive from the vehicle.

The response means may include linkage for controlling the speed of the vehicle, and a device adapted to provide lost motion in the linkage, the response means circuit being adapted to operate the device when effective current flows in the amplifying circuit, thereby to provide lost motion in the linkage. The linkage may include a pivotally mounted shaft. The device for providing lost motion may include a member pivotally mounted about the axis of the shaft and arcuately displaced relative to the shaft, a disengageable clutch adapted to connect the member releasably to the shaft, and clutch disengaging means responsive to flow of effective current of adequate magnitude in the response means circuit to disengage the clutch.

The clutch disengaging means may comprise a solenoid having connections for connecting it to the response means circuit. The clutch may comprise a collar around the shaft and axially displaceable relative to the shaft by the solenoid; a second collar fast with the shaft and axially spaced from the first collar, the pivotally mounted member being disposed between the collars; male elements held captive by the member but axially displaceable relative thereto, the collar fast with the shaft having a face adjacent the member and provided with recesses adapted to receive the male elements in engagement, the male elements and recesses being arranged in circumferentially spaced relationship about the shaft axis; and bias means to urge the axially displaceable collar axially into abutment with the male elements for engagement with the recesses, and for engaging the clutch. Disengagement of the clutch takes place by energization of the solenoid by current flow in the response means circuit, thereby withdrawing the axially displaceable collar against the action of the bias means and withdrawing the male elements from engagement with the recesses, and thereby permitting arcuate displacement of the pivotally mounted member about the shaft axis and thus providing lost motion. The male elements may be balls held captive in holes provided in the pivotally mounted member.

An alternative arrangement of response means may include linkage for controlling the speed of the vehicle, the linkage including a shaft pivotally mounted about an axis and biassed to an initial position corresponding to vehicle minimum speed, an arm fast with the shaft, a control rod for displacing the arm and the shaft to control the speed of the vehicle, and a resilient connection connecting the control rod and the arm; and a device connected to the arm and responsive to current flow in the response means circuit to displace the shaft arcuately about its pivotal axis to its initial position against the resilience of the resilient connection. The device may include a variable volume chamber defined by walls, at least one of which is displaceable relatively to the others to vary the volume of the chamber, the connection between the device and the arm being a connecting rod connected to the displaceable wall and to the arm; a fluid flow connection to the chamber; a valve in the fluid flow connection and operable to control fluid flow into and out of the said chamber; and a solenoid energizable by current flow in the response means circuit to control the operation of the valve.

The said chamber may be a cylinder and the displaceable wall may be a plunger reciprocable within the cylinder. The fluid flow connection may be adapted for connection to a low pressure chamber below atmospheric pressure, and the valve when unoperated may provide a passage connecting the variable volume chamber to atmosphere, and when operated may close off the connection to atmosphere and may provide a passage connecting the variable volume chamber to the low pressure chamber.

The signal-emitting means may include electrically conducting loop means having connecting means for operative connection to the transmitter and laid along a traffic-carrying zone, for example, a highway, along which the speed of the vehicles is to be controlled; and the signal-receiving means may include a pick-up coil adapted for mounting below a vehicle. The electrically conducting loop means may comprise a plurality of loops, each loop having loop-connecting means adapted for connection in series with the other loops; whereby the speed control zone may be enlarged and restricted as desired. The loop-connecting means may also be adapted for connection to the transmitter, whereby varying selected portions of a zone provided with loop means may be subjected to varying speed control to suit varying traffic conditions.

The transmitter may have connecting means for connection to the electrically conducting loop means, the said connecting means including a transformer having a series of tap connections for providing the best operating current in the loop means depending upon the impedance of the loop means for controlling the zone. The loop means may comprise a pair of laterally spaced buried conductors extending longitudinally along the zone, the connecting means being provided between adjacent ends of the longitudinal conductors.

The transmitter may be adapted to transmit its signals at a frequency of from 1–6 kilocycles per second, and may have control means for varying the frequency to any desired value within this range. The transmitter may also be provided with transmitter-indicating means in the form of a gauge calibrated in speed units, for indicating to an operator at a control station, the speed corresponding to a particular frequency for which the speed control is to be exercised.

The invention extends not only to the apparatus as a whole but also to the transmitter, the signal-receiving means, and the response means.

An embodiment of the invention particularly adapted for use with a motor vehicle, will now be described by way of example, with reference to the accompanying drawings.

In the drawings:

FIGURE 5 shows an axial section of a device for providing lost motion in linkage for controlling the speed of a motor vehicle;

FIGURE 6 shows a cross-sectional view at VI—VI in FIGURE 5;

FIGURE 7 shows an axial end elevation at VII—VII in FIGURE 5 of half of the end collar;

FIGURE 8 shows an axial section of a solenoid operated pneumatic valve forming part of the response means;

FIGURE 9 shows a side elevation of linkage and an axial section of a plunger and cylinder assembly, all forming part of the response means; and FIGURE 10 shows an elevation at X—X in FIGURE 9.

The invention will first be described with reference to FIGURES 1 and 2 of the drawings to give a general idea of the apparatus. Thereafter, the various parts of the apparatus will be described more specifically.

Figure 2:
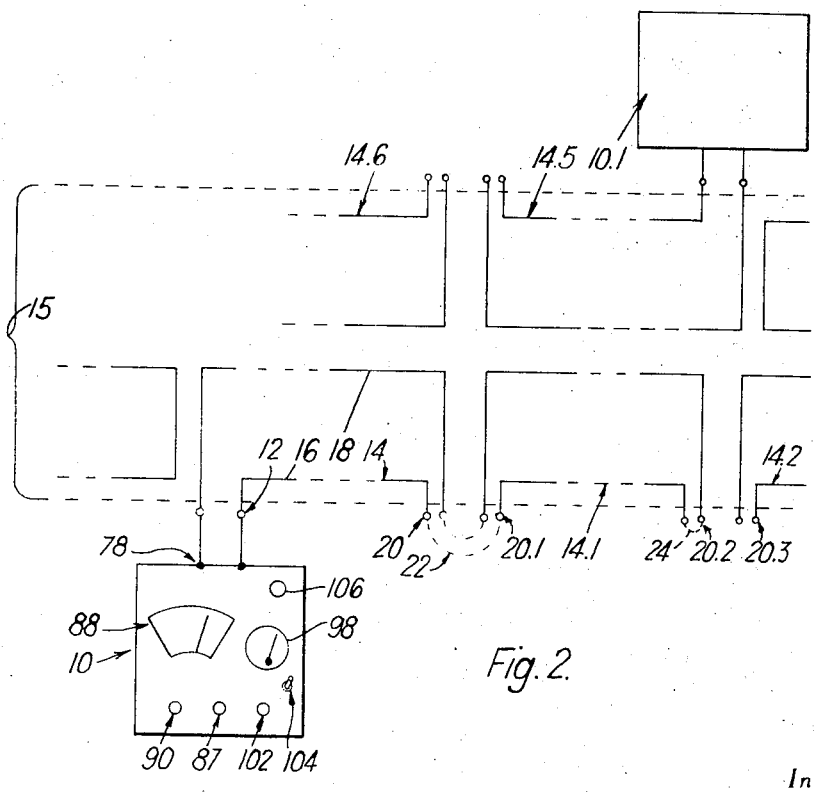
FIGURE 2 shows diagrammatically the arrangement of loop means along a zone in which speed control is to be exercised over vehicles.

Referring to FIGURE 2 of the drawings, reference numeral 10 refers to signal-emitting means in the form of a transmitter adapted to generate frequency signals within the range of from 1–6 kilocycles per second. The transmitter has terminals 78 for connection to connecting means 12 of loop means 14 comprising a pair of limbs 16 and 18 disposed longitudinally along a zone 15 within which the speed of vehicles to be controlled. The loop means 14 has connecting means 20 adapted to be connected to the connecting means 20.1 of another loop 14.1 if the zone 15 is to be extended. The loop 14.1 may be provided with further connecting means 20.2, adapted for connection to the connecting means 20.3 of a yet further loop 14.2. In this way, the zone over which speed control is to be exercised, may be extended or reduced, as desired.

If those portions of the zone served by the loops 14.1 and 14.2 are not to be subjected to speed control, for example, when traffic conditions do not require it, then speed control can be exercised only over the zone served by the loop 14, by providing a connection across the connecting means 20. If the zone served by the loop 14.1 is also to come into operation, then the connecting means 20 and 20.1 will be connected as indicated by connections 22 shown in dotted lines. Then the connections 20.2 will be joined as shown by dotted lines 24. If all the loops in a zone are to be operative, then the connections 20.2 and 20.3 will be connected in similar fashion to that shown at 22. The remaining loops will be connected in series in similar fashion, if the zone is to be extended.

The loops 14, 14.1 and 14.2 may therefore all be operatively connected to the signal-emitting means 10, or only as many of them may be connected, as may be required to suit traffic conditions. If desired, some loops may be connected in series, to be served by one signal-emitting means 10, for a particular control speed, whereas the remaining loops, may be connected to another signal-emitting means like 10, for some other control speed.

The loops 14, 14.1, 14.2, and so on, may be arranged to serve a road or highway carrying traffic in both directions in which case the control speed for traffic in both directions will be the same. Alternatively, if desired, and if traffic conditions warrant it, the control speed for two directions of traffic, for example in a two-lane highway, may be different in opposite directions by providing a parallel set of loops 14.5, 14.6, and so on, having means for connection to another signal-emitting means 10.1.

The signal-emitting means 10 and 10.1, are each adjustable to send a signal of a selected frequency, corresponding to a particular speed for which vehicles are to be controlled, along the loops 14, 14.1, 14.2, 14.5, and so on. This signal is received by apparatus within a vehicle, and will be more fully described with reference to FIGURE 1.

Figure 1:
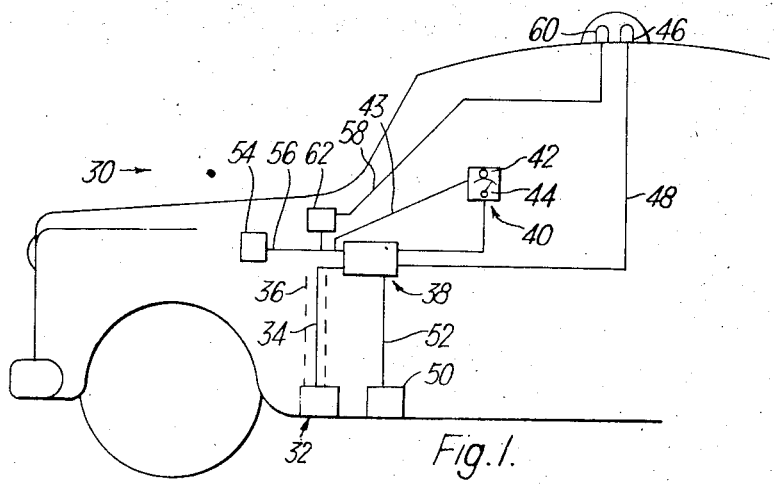
FIGURE 1 shows diagrammatically in block diagram form, the arrangement of apparatus according to the invention, in a motor vehicle.

Referring to FIGURE 1 of the drawings, reference numeral 30 refers generally to a motor vehicle having mounted below it a pick-up coil 32, and mounted such that it will pick up by induction the frequency signal sent along the various loops served by the signal-emitting means. The signal received by the pick-up coil 32 is passed along a conductor 34 which is shielded by a shield 36 to signal receiving means 38.

As soon as a signal is received by the signal receiving means 38, indicating means 40 mounted on the dashboard of the vehicle indicates that the vehicle is within a zone subject to speed control. The actual control speed is indicated by an indicator 44 having a pointer which is arranged to be displaced over a scale calibrated in speed units. At the same time, an external indicating means in the form of a light 46 for providing a visible signal and connected to the receiver via connection 48, also lights up, to indicate to other traffic and to traffic supervisor that the speed control apparatus of the vehicle is receiving speed control signals.

There is further provided a device 50 such as a tachogenerator or commutator-type pulse generator having means for receiving drive from the vehicle, and adapted to generate fluctuating electric current, the frequency of fluctuation being proportional to the speed of the vehicle. This fluctuating current is fed into the signal-receiving means 38 by means of conductors 52. This results in a current proportional to the frequency generated by the device 50, which is then superimposed in the signal-receiving means 38, upon a current proportional to the frequency of the emitted signal and received by the pick-up coil 32. As soon as the current proportional to the frequency generated by the device 50 exceeds the current proportional to the frequency of the received signal, then the resultant or effective current is amplified (by an amplifier which will be described more fully hereafter with reference to FIGURE 4 of the drawings) and is sent to a device 54 (to be described more fully hereafter with reference to FIGURES 4 to 10 of the drawings) via conductor 56, for reducing the speed of the vehicle to the control speed.

Part of the effective or resultant current is used to cause flow of current via a conductor 58 to energize warning signal means in the form of a lamp 60 situated externally on the vehicle to be visible to other traffic and to traffic supervisors. A flasher unit 62 is incorporated to ensure that the light 60 will blink. This light 60 serves to indicate that the speed of the vehicle is above the control speed of the control zone and that it is being reduced automatically by means of the speed control apparatus. At the same time additional indicating means in the form of a lamp 42 inside the vehicle is caused to light up, to indicate to the driver that the speed of the vehicle is above the speed limit and that the speed is being automatically reduced. The lamp 42 is connected by means of conductor 43 to the response means circuit via conductor 56.

*Signal-emitting means*

Figure 3:
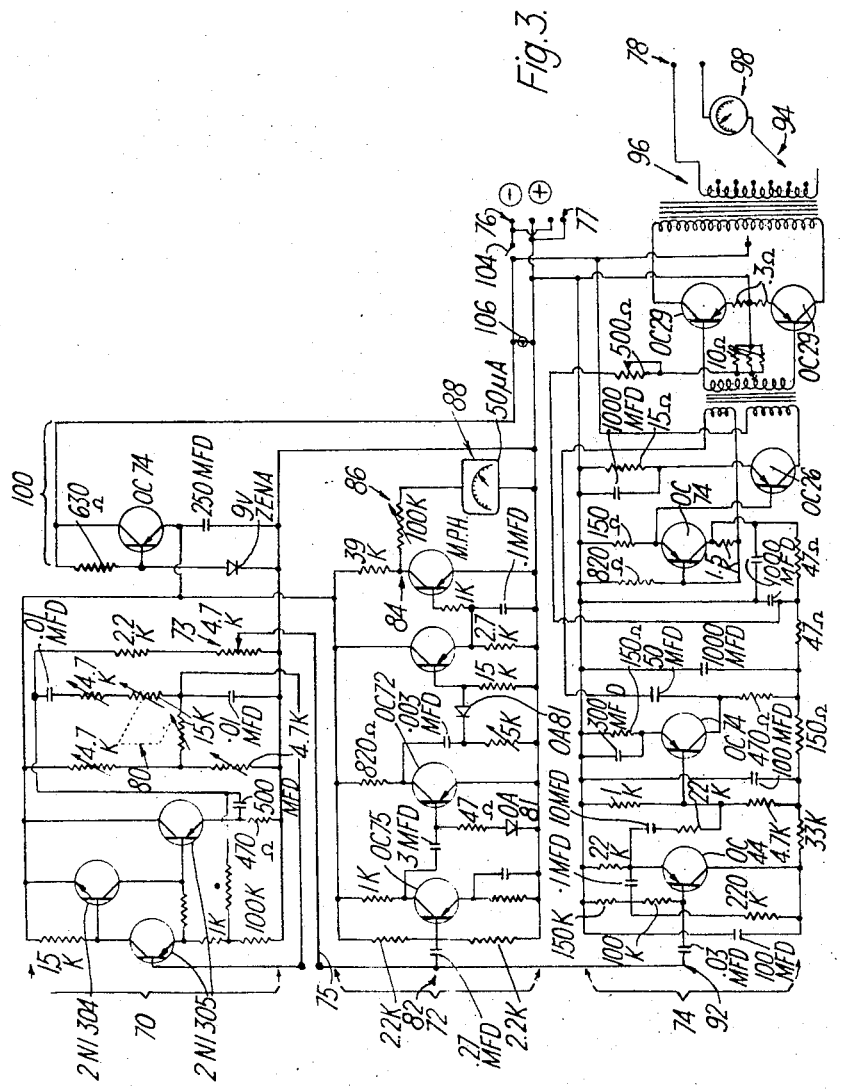
FIGURE 3 shows schematically a wiring diagram of signal-emitting means adapted for connection to the loop means of FIGURE 2.

Referring now to FIGURE 3 of the drawings, the signal-emitting means comprises in broad terms, a variable frequency generator indicated generally by reference numeral 70, a frequency speed convertor indicated generally by reference numeral 72, and a power amplifier indicated generally by reference numeral 74. Terminals 76 are provided, for connection to a source of electrical energy which may be a battery, housed within a single case (not shown) and also housing the rest of the signal-emitting means. Terminals 78 are provided, for connecting the signal-emitting means to the connecting means 12, 20.1, 20.3, and so on, of the loops. (See also FIGURE 2 of the drawings.) When the battery is housed in the casing then additional connections 77 may be provided for trickle charging the battery.

The variable frequency generator shown is of the Wien-bridge type. Any other suitable generator may however be used. It has a pair of interconnected potentiometers coupled as shown at 80 for varying the generated frequency from 1–6 kilocycles per second, to control the frequency of the signal which is fed via power control potentiometer 73 and via conductor 75 into the frequency speed convertor 72 and the power amplifier 74. The setting of the potentiometer 73 is controlled by knob 102. (See FIGURE 2.) The frequency speed convertor 72 shown is a four-stage transistorised convertor for changing from a frequency at 82 to a proportional voltage at 84. The potentiometer 86 is provided for adjusting the full-scale reading on the transmitter indicating means 88 which is calibrated in speed units, and when it has been once set, the setting is not changed.

Adjustment in the control speed is obtained by adjusting the frequency by setting transmitter control means in the form of the coupled potentiometers 80 by means of a control knob 90 (see FIGURE 2), the control speed being indicated on the transmitter indicating means 88. At all times the speed indicated by 88 will be the same as that indicated by the indicating means 40. (See FIGURES 1 and 4.)

The frequency generated by the variable frequency generator 70 is fed into the power amplifier 74 at 92. The amplifier steps up the power input at 92 so that a power of about 25 watts is available at the connecting means 78. The impedance of the loops will vary depending upon the number of loops which have been connected in series. In order to ensure that the maximum energy is transferred from the amplifier to the loops connected for the control of a zone, its impedance may be matched to the amplifier output, by adjusting the tapping 94 of tapping transformer 96, by means of control knob 87 (see FIGURE 2) to give maximum deflection on the indicator 98.

The signal-emitting means comprises further a common voltage stabiliser 100, adapted to stabilise the voltage on behalf of the variable frequency generator 70 and the frequency speed convertor 72, in case of variations in voltage supply at terminals 76. The signal-emitting means is further provided with an on-off control switch 104, an indicating light 106 being provided, to indicate when the signal-emitting means is in operation.

*Signal-receiving means*

Figure 4:
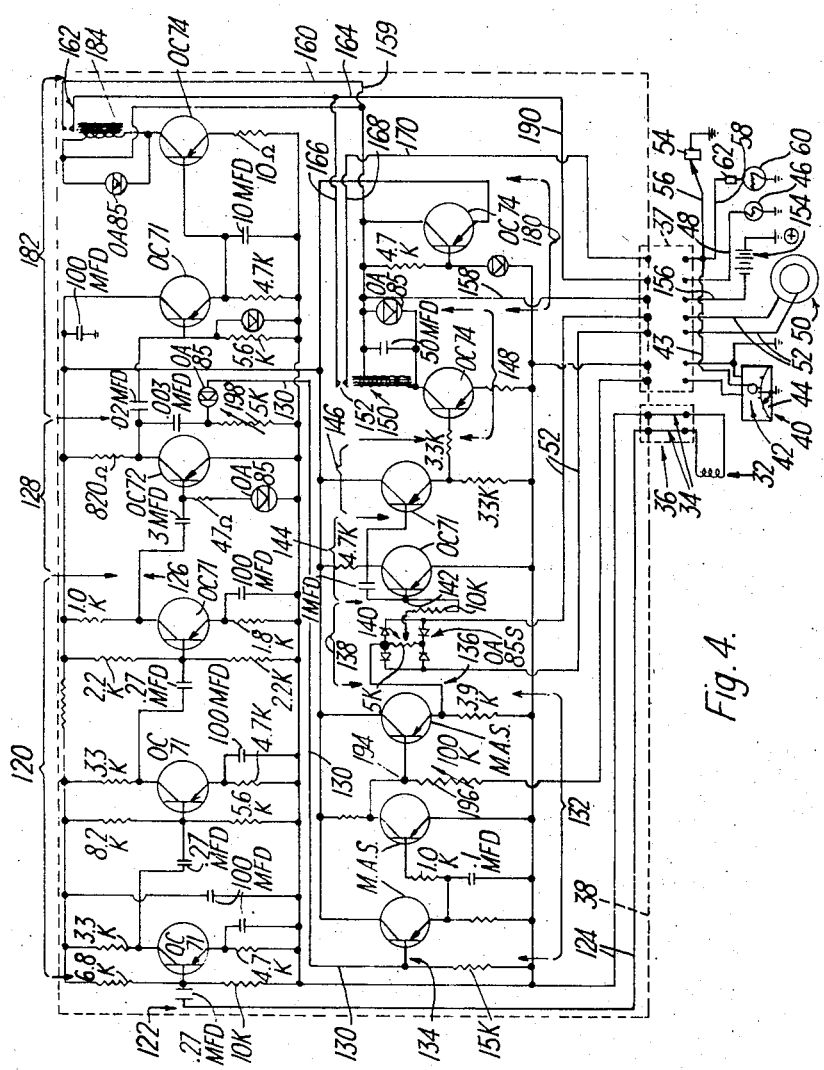
FIGURE 4 shows schematically a wiring diagram of a signal-receiving means and associated equipment adapted for mounting in a motor vehicle.

Referring now to FIGURE 4 of the drawings, reference numeral 38 referring generally to the signal-receiving means, comprises an amplifier indicated generally by reference 120 adapted to amplify the frequency signal (alternating current) received at 122 via conductors 124 and 34, from the pick-up coil 32. It also squares and limits the output at 126. The section 128 converts the change of frequency to change of current. This current is now a rectified direct current proportional to the frequency at 122 and is fed via the conductor 130 at 134 into an inverting amplifier generally indicated by reference numeral 132, which inverts the signal. As the input signal current to the amplifier 132 rises at 134 so the output signal from amplifier 132 falls at 136.

The section generally indicated by reference numeral 138 rectifies the alternating current output received from the tacho-generator 50 via the conductors 52. The potentiometer 140 provides an adjustment to compensate the varying mechanical gearing differences (e.g. in r.p.m. per mile) from one vehicle to another. This potentiometer is set for the vehicle when the apparatus is installed and is not varied thereafter.

At reference numeral 142, the tacho-generator output having been superimposed upon the signal at 136 of opposite polarity, the signal at 142 is the net difference between the electrical energy due to the signal received from outside the vehicle from the signal-emitting means 10, 10.1, and the electrical energy produced by its road speed from within, by the tacho-generator 50. The net difference of these two energies is the effective energy for limiting the vehicle's speed.

A switching transistor generally indicated by reference numeral 144, is triggered by a positive current signal at 142, to pass current to a current amplifier generally indicated by reference numeral 146. The output from this amplifier 146 is fed to a switching transistor 148, which is adapted to operate relay 150. Operation of this relay 150 closes contacts 152 thereby allowing current to pass from battery 154 of the vehicle, via conductors 156, 158, 159, 160, via contacts 162 (operation to be described more fully hereafter), via conductors 164, 166, contacts 152, conductors 168, 170 and 56 to the device 54, for controlling the speed of the vehicle. (See also FIGURE 1 of the drawings.) The device 54 will be described more fully hereafter with reference to FIGURES 5 to 10 of the drawings. Thus when the positive output of section 138 over-balances the negative output of section 132 at the point 136, the excess positive current at 142 actuates sections 144, 146, and 148, to operate the relay 150, thereby closing its contacts 152, and to effect control of the engine. When the tacho-generator positive output along conductors 52 balances or falls below the negative signal strength at 136, there is no positive energy at 142, the sections 144, 146, and 148 are de-energized, and the relay 150 becomes unoperated and its contacts 152 open. No energy therefore reaches the device 54, and the vehicle is no longer subject to automatic control.

A voltage stabiliser generally indicated by reference numeral 180 is provided on the main source of power supply which consists of the vehicle battery 154, and its generator. This voltage stabiliser is provided, because of variations in the charging rate of the generator of the vehicle, the state of charge of the battery of the vehicle, and because of demands on the battery and generator by the electrical equipment of the vehicle.

The circuitry generally indicated by reference numeral 182, is provided for preventing an excessive tacho-generator output at high speeds operating the sections 144, 146, and 148, when there is no signal being received by pick-up coil 32. The circuitry 182 acts as an over-speed control, thus preventing the automatic control of the speed of the vehicle, when that is not desired. When any signal is picked up by the pick-up coil 32, the circuitry 182 actuates the relay 184, thereby closing the contacts 162, and thereby enabling the effective current from the battery reaching the device 54, via the conductors 156, 158, 159, 160, contacts 162 of relay 184, conductors 164, 166, contacts 152 of relay 150, conductors 168, 170 and 56. When there is no signal at 122, the circuitry 182 remains unenergized and therefore relay 184 remains inoperative and its contacts 162 are open thereby ensuring that no power can be supplied to the device 54, by the closure of contacts 152. A light 60 with flasher unit 62 is connected to conductor 56, by means of a conductor 58. The light 60 therefore blinks, when current flows in conductor 56, causing the device 54 to operate. The light 60, when it blinks, will therefore indicate externally that the vehicle is exceeding the speed limit set and that its speed is being reduced compulsorily. The lamp 42 is connected via conductor 43 to conductor 56, and therefore lights up at the same time as light 60 when 54 is actuated, thereby indicating inside the vehicle that the speed limit is being exceeded and that the speed is being reduced compulsorily.

The light 46 is connected via conductor 48, and via conductors 190, 164, contacts 162 of relay 184, conductors 160, 159, 158, and 156, to the battery 154. Upon closure therefore of the contacts 162, when a signal is being received, light 46 will light up thereby indicating to other traffic, and to traffic control officers, that the vehicle is receiving a speed control signal and is subject to control. This light lights up whenever the vehicle is in any speed control zone, and remains lighted even while the vehicle is travelling below the control speed, as long as a signal is being received at 122.

The indicating means 40 has a pointer 44, displaceable over a scale calibrated in speed units, to indicate the speed limit set for that zone at the time. The deflection of the pointer 44 is proportional to the current at 194 where it is inversely proportional to the frequency input at 122. The potentiometer 196 serves to calibrate the indicating means 40, so that the pointer 44 reads directly the road speed limit set at the signal-emitting means 10. The potentiometer 196 is set to compensate variations within manufacturing tolerances. When once set, it is not changed. The pointer 44 and scale correspond to the indicating means 88 on the signal-emitting means 10, and have identical readings when they are in operation.

The receiver 38 is arranged to operate on a frequency ranging from 1–6 kilocycles per second. At 6 kilocycles per second, the signal output at 136 is reduced almost to zero, which results, when the vehicle is at rest, in the operation of sections 144, 146, and 148. At this frequency therefore, the contacts 152 and 162 of both relays 150 and 184 are closed, and irrespective of the output of the tacho-generator 50, the device 54 is energized and thus the vehicle is stopped, and the engine is reduced to idling. Lesser frequencies than this maximum provide graduated speed limits ranging from say 5 to 50 miles m.p.h. or any other limits which may be required. The gradient say 0–30 m.p.h. or 0–80 m.p.h. may be adjusted by the potentiometer 198 and the scale may be recalibrated by the other potentiometer 196.

*Response means*

Referring now to FIGURES 4, 5, 6, and 7 of the drawings, reference numeral 54 refers generally to the device for responding to the output from the signal receiving means 38. The response means circuit includes sections 148, 180, relay 184 and the associated conductors including conductor 56. The device 54 comprises a solenoid generally indicated by reference numeral 200 having a connection 202 for connection to earth, and having a connection 204, for connection to conductor 56 (see FIGURES 1 and 4). The solenoid 200 is mounted coaxially with the shaft 206 pivotally mounted in the wall of a carburettor barrel 207, and having attached to it a throttle butterfly valve 208. The shaft 206 is biassed to an initial closed position about its axis by bias means not shown. There is provided an end collar 210, fast with the shaft 206 and having a plurality of circumferentially spaced recesses 212 adapted to receive in engagement male elements in the form of balls 214. The device further includes an armature in the form of a collar 216, which is loose on the shaft 206, and which is axially displaceable relative to the shaft, and to the collar 210, by means of the solenoid 200. The collar 216 is biassed towards the collar 210, by means of helical coil spring 218. Between the collars 210 and 216, there is provided a member 220 pivotally mounted about the axis of the shaft 206, and having holes 222 circumferentially spaced about the axis of the shaft 206 and adapted to register with the recesses 212 in collar 210. The member 220 is adapted to hold captive the balls 214 within the holes 222. Thus when solenoid 200 is not energized, collar 216 is pressed against balls 214 thereby engaging them firmly in recesses 212. Member 220 is thereby effectively locked to collar 210.

The connections connecting the signal-receiving means 38 to the outside apparatus may conveniently take place via one or more multi pin plugs. In this connection, please note the conductors within the dotted line 37.

A device 54.1, alternative to device 54 is shown in FIGURES 8, 9, and 10 of the drawings. Reference numeral 200 refers again to a solenoid having an earth connection 202 and another connection 204 adapted for connection to conductor 56. Coaxially with the solenoid 200, there is provided a tube 250 having a pair of axially spaced valve seats 252 and 254. Within the tube there is provided a valve closure member 256 adapted to seat on the lower valve seat 252 when the solenoid is not energized, and adapted to seat on the upper seat 254 when the solenoid is energized. At its upper end the tube 250 is provided with an opening 257 open to atmosphere, and at its lower end it is provided with connecting means 258 for connection to a low pressure chamber (not shown). Between the seats 252 and 254 there is provided a connection 260 for connection to a connection 262 of a variable volume chamber in the form of a cylinder 264 having a plunger 266 reciprocable within the cylinder 264.

The plunger 266 has a connecting rod 268 connected at one end to it and at the other end to an arm 270 fast with shaft 206 pivotally mounted about its axis in a barrel 207. The shaft 206 has a butterfly valve 208 fast with it and is biassed to the closed position of the butterfly valve 208 by bias means not shown. A link 272 is pivotally connected to the arm 270 by means of a pin 274 and depends from it. The link 272 is resiliently connected to the arm 270 by means of a spring 276. The link 272 is displaceable in the direction of arrow 278 against the action of the bias means biassing the shaft 206 to its initial position, by means of link 280. Such displacement will be transmitted to the arm 270 via the spring 276, for controlling the opening of the butterfly valve 208, and hence the speed of the vehicle. For an internal combustion engine, the link 280 will normally be connected to the accelerator pedal.

The solenoid is shown having its axis vertical, for use with the particular type of valve shown. However, it will be understood that with suitable valve means, the solenoid may be arranged to have its axis at any desired inclination to the vertical or horizontal.

In operation, a traffic control officer at a control station will decide upon the speed limit to be applied to a particular zone. He will thereupon adjust the frequency of the signal-emitting means, by manipulating the knob 99 and he will adjust the frequency corresponding to a desired control speed which will be indicated by the indicating means 88. All the vehicles within the zone will therefore pick up this signal and having picked up this signal, their relays 184 will operate, and their lights 46 will light up. The control speed set by the traffic control officer on the signal-emitting means 10 will be indicated in the vehicles on their indicating means 40. As long as their speeds remain below the control speed set on the signal-emitting means 10 and indicated by the pointer of indicating means 44, their devices 54 or 54.1 will remain inoperative.

However, as soon as their road speeds exceed the control speed, their tacho-generators 50 will generate sufficient current to result in an effective current being available at 142 (see FIGURE 4), thereby causing the sections 144, 146, 148 to operate and thereby actuating their devices 54 or 54.1 and subjecting the vehicles to compulsory control.

The device 54 becomes operative when current flows in the solenoid 200 (see FIGURES 5 to 7). When this happens the solenoid pulls in the collar 216, thereby permitting the balls 214, to disengage from the recesses 212 in the end collar 210 and thereby permitting the shaft 206, to return to its initial position under the bias means (not shown) and thereby closing off the butterfly valve 208, and causing the vehicle to reduce speed. As soon as the speed of the vehicle has been sufficiently reduced, the current generated by the tacho-generator 50 is no longer sufficient to cause the operation of the relay 150 and therefore, the solenoid 200 becomes deenergized, thereby permitting the displacement of the collar 216, by the helical spring 218. This results in the balls 214 being urged into engagement with the recesses 212, thus locking the member 220 to the collar 210.

The member 220 forms part of a link system, connected to the accelerator pedal of a motor vehicle. One such member of the link system is indicated at 224. Upon closure of the butterfly valve 208 by the solenoid 200, the recesses 212 go out of register with the balls 214 and holes 222. Registration is restored for reengagement when the accelerator pedal is released. As soon as engagement takes place, the vehicle is again under the driver's control and will remain under his control, until such time as he attempts to exceed the speed limit set.

The device 54.1 becomes operative when current flows in the solenoid 200. When this happens, the valve closure member 256 is raised off its seat and the interior of the cylinder is subjected to low pressure. This causes displacement of the plunger 266 in the direction of the arrow 282 thereby closing off the butterfly valve 208, irrespective of the positions of the links 280 and 272. The spring 276 permits the arm 270 to be displaced relatively to the link 272. Closing off of the butterfly valve 208 causes the speed of the vehicle to be reduced. As soon as its speed falls below the control speed, the solenoid becomes de-energized, the closure member seats on seat 252 and becomes unseated from seat 254, thereby opening the cylinder to atmospheric pressure and closing off the low pressure chamber. The plunger therefore becomes freely displaceable in the cylinder and permits setting of the butterfly 208 by means of the accelerator pedal connected to links 280 and 272. As soon as the control speed is exceeded, however, then the response means will seize control and will close off the butterfly valve.

It is an advantage of this invention, that the speed limit can be adjusted, from a control station, to suit prevailing traffic conditions. Thus it is possible along a particular stretch of road, to have varying speed limits, depending upon the traffic conditions and depending upon the speed which is regarded by the traffic control officer, as being safe for the traffic conditions prevailing at the time. The speed limit in any one zone can be adjusted to a value considered by the traffic control officer to be safe. Where the traffic of a city is controlled from a central control station, various zones in the city may be brought under different control speeds depending upon the traffic density in them.

The invention has the further advantage, that a traffic control officer and other traffic can see at a glance, whether or not a vehicle is receiving a traffic control speed signal by looking at its light 46. Furthermore, blinking of the light 60 will indicate immediately that a car is being decelerated compulsorily so that drivers of other vehicles can take care.

A further advantage of this invention is that it is possible to stop traffic completely, if for any reason this becomes necessary to do so. This can be of particular advantage at railway level crossings, which can be so arranged, to have an approaching train energizing signal-emitting means suitably positioned, for causing approaching traffic to stop at the level crossing, until such time as the train has passed and until such time as it has de-energized the signal-emitting means controlling that portion of the road, at the level crossing. The energization of the signal-emitting means can take place automatically, by the train operating a switching device when it is close to the level crossing.

The signal-emiting means may also be integrated with existing traffic light systems at intersections. The red light (and the yellow light if desired) will then correspond to a zero speed limit and the green light to another limit. These traffic lights will be connected to the signal emitting means to emit signals at the required frequencies.

The transmitter can be made portable to be transportable by motorcycle. It is then possible for a traffic officer to place a zone under speed control temporarily during heavy traffic periods. The zone can then be left without speed control during periods when traffic is not so heavy as to warrant speed control.

As mentioned previously, the tacho-generator 50 may be replaced by a commutator-type pulse generator, for generating pulses. It is, therefore, to be understood that wherever reference is made to a tacho-generator, a pulse generator may also be used.

I claim:

1. Speed control apparatus for the limitation of speed of motor vehicles along a traffic-carrying roadway by means of a traffic control officer stationed alongside the roadway, and which includes (a) loop means comprising a plurality of electrically conductive loops defining traffic control zones along the roadway and having limbs laid longitudinally on either side of a roadway, the limbs having connections at opposite ends adapted for connecting the limbs in series with each other, and adapted for connection to signal-emitting means;

(b) signal-emitting means in the form of a variable frequency transmitter adapted for positioning alongside the roadway and operable by a traffic control officer, and including (i) means for connection to the connections of the limbs of the loops alongside the roadway;

(ii) indicating means for indicating in linear and time units, the speed corresponding to the frequency within the range at which it can be set;

(iii) a tapping connection permitting variation in its output voltage to match the impedance of loop means constituted by varying combinations of loops;

(c) control apparatus adapted for mounting on a motor vehicle having an engine whose power output is controllable by a throttle, and which includes (i) signal-receiving means;

(ii) an induction pickup coil adapted to receive speed control signals from the loop means, and connected to pass received speed control signals to the signal-receiving means;

(iii) a speed signal device adapted to receive drive from the vehicle and to generate a fluctuating current signal whose frequency of fluctuation corresponds to the road speed of the vehicle;

(iv) means for feeding the said generated fluctuating current signal into the said signal-receiving means, the said signal-receiving means having a mating circuit for superimposing upon each other currents corresponding to the said received and generated signals and adapted to provide an effective current only when the current corresponding to the generated signal exceeds the current corresponding to the received speed control signal; and (v) responsive means adapted to respond to such effective current to bring about the closing-off of the throttle of the engine.

2. Speed control apparatus according to claim 1, in which the control apparatus includes indicating means in the vehicle and mounted to be visible to the driver, the indicating means being operatively connected to the signal-receiving means and being adapted to indicate the controlled speed at which the signal-emitting means at the roadside has been set by the traffic control officer.

3. Speed control apparatus for the limitation of speed of motor vehicles along a traffic carrying roadway comprising electrically conductive loop means comprising limbs laid longitudinally along either side of a roadway, the limbs having at least two connections at the side of the roadway adapted for connection to signal emitting means; signal emitting means to send signals of variable frequency through said two connections into said loop means, and thereby to provide a traffic control zone defined by said loop means; control apparatus adapted for mounting on a motor vehicle having an engine whose power output is controllable by a throttle, and which includes signal-receiving means, an induction pick-up coil adapted to receive signals from said loop means, and connected to pass signals into said signal-receiving means; a speed signal device adapted to receive drive from the vehicle and to generate a fluctuating current signal whose frequency of fluctuation corresponds to the road speed of the vehicle; means for feeding the said generated fluctuating current signal into the said signal-receiving means; said signal-receiving means having rectifying means to rectify the currents corresponding to the said received and generated signals, and having a mating circuit for superimposing upon each other the said rectified currents proportional to the two signals and adapted to provide an effective current only when the current corresponding to the generated signal receives the current corresponding to the received signal; and response means adapted to respond to such effective current to bring about the closing-off of the throttle of the engine; throttle linkage linking the accelerator and the throttle of the vehicle, the said linkage including means to bias the throttle to the closed position, a clutch for providing lost motion in the linkage, and a solenoid to operate said clutch, said solenoid being energizable in response to flow of effective current; said clutch comprising a shaft, a collar around said shaft and axially displaceable relative to said shaft by said solenoid, a second collar fast with said shaft and axially spaced from said first collar, a member pivotally mounted about said shaft axis and disposed between said collars, male elements held captive by said pivotally mounted member, but axially displaceable relative thereto, said collar fast with said shaft having a face adjacent to said pivotally mounted member and provided with recesses adapted to receive said male elements in engagement, said male elements and recesses being arranged in circumferentially spaced relationship about said shaft axis, and bias means to urge the axially displaceable collar axially into abutment with said male elements for engagement with the recesses, and for engaging said clutch; thus permitting disengagement of said clutch by energization of said solenoid by said response means circuit, thereby withdrawing said axially displaceable collar against the action of said bias means, and withdrawing said male elements from engagement with the recesses, and thereby permitting arcuate displacement of said pivotally mounted member about said shaft, and thus providing lost motion.

4. Speed control apparatus according to claim 3, in which the male elements are balls held captive in holes provided in the pivotally mounted member.

5. Speed control apparatus for the limitation of speed of motor vehicles along a traffic carrying roadway comprising electrically conductive loop means comprising limbs laid longitudinally along either side of a roadway, the limbs having at least two connections at the side of the roadway adapted for connection to signal emitting means; signal emitting means to send signals of variable frequency through said two connections into said loop means, and thereby to provide a traffic control zone defined by said loop means; control apparatus adapted for mounting on a motor vehicle having an engine whose power output is controllable by a throttle, and which includes signal-receiving means, an induction pick-up coil adapted to receive signals from said loop means, and connected to pass signals into said signal-receiving means; a speed signal device adapted to receive drive from the vehicle and to generate a fluctuating current signal whose frequency of fluctuation corresponds to the road speed of the vehicle; means for feeding the said generated fluctuating current signal into the said signal-receiving means; said signal-receiving means having rectifying means to rectify the currents corresponding to the said received and generated signals, and having a mating circuit for superimposing upon each other the said rectified currents proportional to the two signals and adapted to provide an effective current only when the current corresponding to the generated signal receives the current corresponding to the received signal; and response means adapted to respond to such effective current to bring about the closing-off of the throttle of the engine; said response means including throttle control linkage between the accelerator and throttle of the engine, the said control linkage being resilient and biassed to the throttle closed position, and having an accelerator section, a throttle section, and a resilient connection between the said sections, and a variable volume chamber defined by walls, at least one of which is displaceable relatively to the others to vary the volume of the chamber, and a connection between the said wall and the throttle section of the linkage to permit resilient displacement of the throttle section of the linkage relative to the accelerator section to close the throttle.

6. Speed control apparatus according to claim 5, in which there is provided a fluid flow line connectable to the chamber and to the manifold of the engine in such a fashion that manifold suction applied to the said chamber will cause the throttle to be closed against the action of the resilient connection.

7. Speed control apparatus according to claim 6, in which there is provided a fluid flow control valve in the fluid flow line, and having an atmosphere port leading to the atmosphere, and a manifold port leading to a connection adapted for connection to the engine manifold, the valve having a closure member biassed to a position in which the manifold port is closed to the fluid flow line, and the atmosphere port is open, there being provided a solenoid operable upon flow of effective current in the mating circuit of the apparatus to operate the control valve to close the atmosphere port and to open the manifold port to the fluid flow line.

References Cited
UNITED STATES PATENTS

| | | | |
|---|---|---|---|
| 2,019,976 | 11/1935 | Huebscher | 180—82 |
| 2,656,002 | 10/1953 | Keeton et al. | 180—82 |
| 2,780,300 | 2/1957 | Beyer | 246—182 |
| 2,852,086 | 9/1958 | Cordry | 246—182 |
| 2,971,596 | 2/1961 | Davis et al. | 180—82 |
| 3,008,532 | 11/1961 | Reed | 180—82 |
| 3,042,136 | 7/1962 | Havnen | 180—82 |
| 3,072,785 | 1/1963 | Hailes | 246—187 |
| 3,088,538 | 6/1963 | Brennan | 180—82 |
| 3,195,671 | 7/1965 | Wolfe | 180—82 |
| 3,240,929 | 3/1966 | Hughson | 246—182 |
| 3,007,538 | 11/1961 | Hill | 180—82 |
| 3,018,367 | 1/1962 | Mountjoy | 180—82 |
| 3,045,112 | 4/1962 | Hailes | 246—63 |

KENNETH H. BETTS, *Primary Examiner.*